United States Patent

[11] 3,617,235

| [72] | Inventors | Isak Andreas Friestad;<br>Oyvind Skauli, both of Flattenlia,<br>Porsgrunn, Norway |
|---|---|---|
| [21] | Appl. No. | 705,942 |
| [22] | Filed | Feb. 16, 1968 |
| [45] | Patented | Nov. 2, 1971 |
| [73] | Assignee | Norsk Hydro-Elektrisk Kvaelstofaktie-<br>selskab<br>Oslo, Norway |
| [32] | Priority | Feb. 18, 1967 |
| [33] | | Norway |
| [31] | | 166,917 |

[54] PROCESS BY SPRAYING MELTS OR SUSPENSIONS WITH LOW WATER COMPRISING FERTILIZERS CONTAINING THE PLANT NUTRIENTS NITROGEN AND PHOSPHORUS
9 Claims, No Drawings

[52] U.S. Cl............................................................. 71/1,
71/33, 71/50, 71/59, 71/64 DB
[51] Int. Cl............................................................ C05c 1/00
[50] Field of Search........................................... 71/34, 39,
43, 59, 64, 64 DB, 33, 1, 50, 61

[56] References Cited
UNITED STATES PATENTS

| 3,214,260 | 10/1965 | Oi et al. .......................... | 71/43 |
| 3,231,364 | 1/1966 | Booth et al. ................... | 71/39 |
| 3,301,657 | 1/1967 | Dee et al......................... | 71/43 |
| 3,379,496 | 4/1968 | Russo.............................. | 71/64 |
| 3,396,003 | 8/1968 | Scheel et al.................... | 71/34 |

OTHER REFERENCES

Phillips et al., Journal of Agricultural and Food Chemistry, " Effects of Particle Size of Raw Materials on Granulation of Fertilizers," Vol. 6, No. 6, June 1958, pp. 449– 453.

Primary Examiner—Reuben Friedman
Assistant Examiner—Charles N. Hart
Attorney—Wenderoth, Lind & Ponack ABSTRACT: A process is provided for the preparation of fertilizer compositions, which comprises spraying melts or suspensions with low water content, said melts or suspensions comprising fertilizers containing the plant nutrients nitrogen and phosphorous, especially containing ammonium phosphates and ammonium nitrate, the melts or suspensions being mixed with solid potassium salts and possibly with other solid substances before the melt is sprayed through a perforated wall of a centrifuge, whereby the sprayed material is transformed into droplets which are caused to solidify into prills. According to the invention the melt or suspension has a water content less than 5 percent by weight, and the solid substances added to the melt or suspension are grain graded so that more than 7 percent by weight has a grain size exceeding 0.1 mm.

PROCESS BY SPRAYING MELTS OR SUSPENSIONS WITH LOW WATER COMPRISING FERTILIZERS CONTAINING THE PLANT NUTRIENTS NITROGEN AND PHOSPHORUS

The invention relates to a process for the preparation of fertilizer compositions, which comprises spraying melts or suspensions with low water content, said melts or suspensions comprising fertilizers containing the plant nutrients nitrogen and phosphorus, especially containing ammonium phosphates and ammonium nitrate, the melts or suspensions being mixed with solid potassium salts and possibly with other solid substances before the melt is sprayed through a perforated wall of a centrifuge, whereby the sprayed material is transformed into droplets which solidify into so-called prills.

Such mixtures with low water content, which may contain quite large amounts of solid compounds, have hitherto proved difficult to prill by spraying. Mixtures containing large amounts of potassium salts are very viscous and it has been very difficult to mix the solid potassium salt and other solid components evenly and in sufficient amounts in the N,P-melt or suspension. Usually it has been necessary to finely grind the potassium salt, which has the effect that the salt has great difficulty in being wetted by the melt or liquid phase. The finely ground potassium salt, especially potassium chloride, also accelerates reactions between the salt and the melt, which causes thickening of the mixture, so that it cannot be prilled by spraying, but has to be solidified in other ways, e.g. by cooling on a cooling drum etc. or by drum granulation.

In addition to potassium salt, it is possible according to the invention, to have other salts, such as magnesium salts and micronutrients, present in the mixture which is to be prilled.

The purpose of the invention is to facilitate the mixing of the practically water-free melt or suspension with the solid compounds, in such manner that the mixture becomes so fluid that it is suitable for prilling by spraying, even though the amount of solid substances added may be large.

In British Pat. No. 910,140 it is disclosed that the viscosity of the N,P-melt increases when the potassium salt is added, for which reason it is proposed in the said patent to reduce the viscosity by adjusting the pH-value of the N,P,K-melt to less than 4 before prilling by spraying. However, the final product will be acidic, and the adding of potassium salt in the form of potassium chloride may cause thermal decomposition if ammonium and nitrate are present in the mixture. Thus, it becomes necessary to use other and more costly potassium sources than potassium chloride.

British Pat. No. 322,424, which relates to the production of fertilizer prills containing ammonium nitrate, viz N,P- and N,P,K-fertilizer, discloses the process of mixing finely ground solid compounds (for instance, ammonium phosphate, potassium salts, limestone) in a mixer under agitation and then spraying it in the form of drops at a temperature which is 15°-35 C. above the solidification point of the mixture. However, considerable amounts of water must be present in order to obtain a sprayable consistency of the mixture.

British Pat. No. 677,077 discloses the process of producing solid granular fertilizers by vigorous mixing of dry, solid fertilizers with concentrated fertilizer melts in the course of 20-25 seconds in a paddle mixer, after which the mixed material is granulated in the usual way and is thereafter dried and screened. The process is particularly suitable in the mixing of a concentrated ammonium nitrate solution with calcium carbonate. However, water must also be present in this procedure. Nor is the process described in the Patent of Addition, British Pat. No. 717,195, suitable for the mixing of a solid substance with a N,P-melt containing less than 5 percent by weight of water.

The present invention thus relates to a process for the preparation of fertilizer compositions, by spraying melts or suspensions with low water content said melts or suspensions comprising fertilizers containing the plant nutrients nitrogen and phosphorus, especially containing ammonium phosphates and ammonium nitrate, in which the melts or suspensions are mixed with the solid potassium salt and possibly with other solid substances before the melt is sprayed through the perforated wall of a centrifuge, whereby the sprayed material is transformed into droplets which are caused to solidify into so-called prills.

According to the present invention it has been shown that the difficulties mentioned above in connection with the prilling of such N,P,K-mixtures with low water content can be surprisingly avoided even if the melt or suspension of the nitrogen and phosphorus containing fertilizers contains less than 5 percent by weight of water, when more than 70 percent by weight of the solid substances has a grain size exceeding 0.1 mm. If more than 70 percent by weight has a grain size exceeding 0.1 mm., this means that less than 30 percent by weight of the solid compounds passes through a screen with an opening of 0.1 mm.

By the process according to the present invention, it will not only be apparent that the solids added to the melt or suspension will easily be homogeneously mixed into the melt or suspension with low water content, but also that the addition of solids can be increased beyond what would be possible with more finely grained solids, thus providing a consistency of the mixture well suited for spraying.

The spraying is carried out in a per se known manner in a perforated centrifuge, and in the process according to the invention it is possible to use relatively coarse salt, with grain size up to about one-third of the diameter of the orifices in the spraying apparatus. Thus with a diameter of 4-5 mm. of the orifices in a centrifuge we have found that the grain size of, for example, potassium chloride can be more than 1 mm. The advantages of this is in the form of reduced expenses of grinding and reduced dust problems.

Usually the ratio between solid particles and the melt or suspension in the mixture must be below a certain value to be suitable for granulation, especially by means of spraying. This can be attained by increasing the quantity of the liquid phase, for example by the addition of water, or by increasing the temperatures. The use of these possibilities however, is restricted. If the water content exceeds a certain value the solidified prills will mechanically be too weak for further treatment. A high water content further means that the product must be subsequently dried and that its weight per unit of volume will be low. If the temperature is increased, the vapor tension of ammonia, among other things will be excessively high. There will be loss of nitrogen and a risk of undesirable decomposition reactions. In practice this has hitherto meant that it has been necessary, if it is desired to use a prilling process for fertilizers containing N,P,K to confine the fertilizers to types which are relatively poor in potassium, and it has been necessary to dry the product.

In a preferred embodiment of the present invention, potassium chloride is utilized as the solid potassium salt.

According to the process of the present invention it is possible to prill mixtures with high potassium content and low water content, the water content preferably being less than 1 percent by weight, so that subsequent drying will be unnecessary. The ratio of weight between solid substances and liquid phase in the N,P,K-suspension may well be increased to above 1 without difficulty.

Before spraying by means of the centrifuge, it is advantageous to the melt or suspension with the solids for a relatively short period, preferably less than 2 minutes.

In the process according to the invention it is preferable that the pH-value in the mixture be maintained between 5 and 6.5, measured in a dilution of one part by volume of mixture to 13 parts by volume of water.

The process can advantageously be carried out with all N,P-melts and suspensions, wherein N and P components are utilized as a melt or suspension containing phosphates and nitrates of ammonium.

Of the potassium salts, potassium sulfate is more poorly moistened than potassium chloride, and therefore the contact period during the mixing with potassium sulfate ought to be somewhat longer than when potassium chloride is used.

The following examples illustrate the effect obtained by the process according to the invention.

Example 1 shows that when one aspect of the invention is not followed, i.e. when at least 70 percent by weight of the solids do not have a grain size larger than 0.1 mm., a mixture having sufficient fluidity for such a long period that it is suitable for spraying into prills will not be obtained.

Example 2 shows that when about 70 percent by weight of the solids have a grain size greater than 0.1 mm., the mixture of the melt and solids has a fluidity for a sufficiently long period of time, such that the prills may be produced by spraying.

Examples 3 and 4 clearly show the surprising advantageous effect when using the principle according to the invention.

EXAMPLE I

A melt (or suspension) containing nitrogen and phosphorus was produced in a known manner by dissolving raw phosphate in nitric acid with subsequent separation of a certain amount of calcium nitrate followed by neutralization and evaporation. The evaporated suspension had a water content of 0.5 percent by weight, a N-content of 24 percent by weight and a weight ratio of Ca/P and N/P of 0.8 and 3.2 respectively. To the suspension was added, under vigorous agitation, a dry salt mixture consisting of 82.6 percent by weight of potassium chloride, 17 percent by weight of kieserite and 0.4 percent by weight of sodium tetraborate. Of the salt mixture 60 percent by weight was so fine grained that it passed through a screen with openings of 0.06 mm. 72g. of the salt mixture was added per 100 g. N,P-suspension. The mixing was effected in a flask. The temperature of the mixture was kept at 150° C. By the addition of gaseous ammonia the pH-value of the mixture was kept at 5.6, measured in a dilution of 1 volumetric part of mixture to 13 volumetric parts of water. After the addition of the salt mixture a gradual thickening occurred such that the period the mixture could be deemed to be sufficiently fluid for prilling was only 10–15 seconds, which period of time was too short for suitable spraying in a centrifuge.

EXAMPLE 2

Example 1 was repeated, only with the difference that the salt mixture was somewhat coarser, only 30 percent by weight passing through a 0.1 mm. screen and 5 percent by weight passed through a 0.06 mm. screen. After addition of the salt mixture again a gradual thickening occurred. The mixture was, however, more fluid than in example 1 and it was only after about 3 minutes mixing time that the charge had to be considered unsuitable for prilling.

EXAMPLE III

By an analogous process such as described in examples 1 and 2, use was made of a salt mixture in which 90 percent by weight passed through a 0.5 mm. screen and only 8 percent by weight passed through a 0.1 mm. screen. The mixture of the N,P-suspension and salts was more fluid than in examples 1 and 2. After 25 minutes, the mixture was still suitable for prilling.

EXAMPLE IV

Example 3 was repeated but in addition to the salt mixture there was added per 100 g. N,P-suspension 30 g. screened solidified prills of same composition as the final N,P,K-mixture. The grain size of the recycled prills were less than 1.5 mm., and 5 percent by weight was less than 0.5 mm. The mixing was performed at 130° C. In spite of the presence of recycled prills and the fact that the temperature was lowered 20° relative to examples 1–3 the mixture was sufficiently fluid for prilling for about 3 minutes.

This example thus shows that in spite of the fact that the ratio of solid substances/liquid phase was increased to above 1, it was still possible to obtain a satisfactory result.

What is claimed is:

1. In a process for preparing fertilizers containing the plant nutrients nitrogen and phosphorus which comprises forming a fertilizer melt or suspension comprising ammonium nitrate and ammonium phosphates and having low water content, admixing with the said melt or suspension solid potassium salts alone or together with other solid substances and subsequently spraying the mixture through the orifice of a perforated wall of a centrifuge to form droplets which solidify into prills, the improvement according to which at least 70 percent by weight of the potassium salt added to the melt prior to prilling has a grain size exceeding 0.1 mm. and up to about 1/3 of the diameter of said orifice and the melt to which the solid substance is added has a water content less than 5 percent by weight.

2. A process as in claim 1, wherein the other solid substances are comprised of magnesium salts and micronutrients.

3. A process as in claim 1, wherein the grain size of the potassium salts and other solid substances is up to 1/3 of the diameter of the orifices in the centrifuge.

4. A process as in claim 1, wherein the potassium salt is potassium chloride.

5. A process as in claim 1, wherein the mixture of the melt and solid substances has a water content less than 1 percent by weight.

6. A process as in claim 1, wherein the weight ratio of solid substances to liquid phase of the mixture is at least 1.0.

7. A process as in claim 1, wherein the melt is mixed with the solid substances for a period of time less than 2 minutes.

8. A process as in claim 1, wherein the pH of the mixture is maintained between 5.0 and 6.5.

9. A process as in claim 1, wherein at least 92 percent by weight of the solid substances added to the melt has a grain size exceeding 0.1 mm.

* * * * *